UNITED STATES PATENT OFFICE.

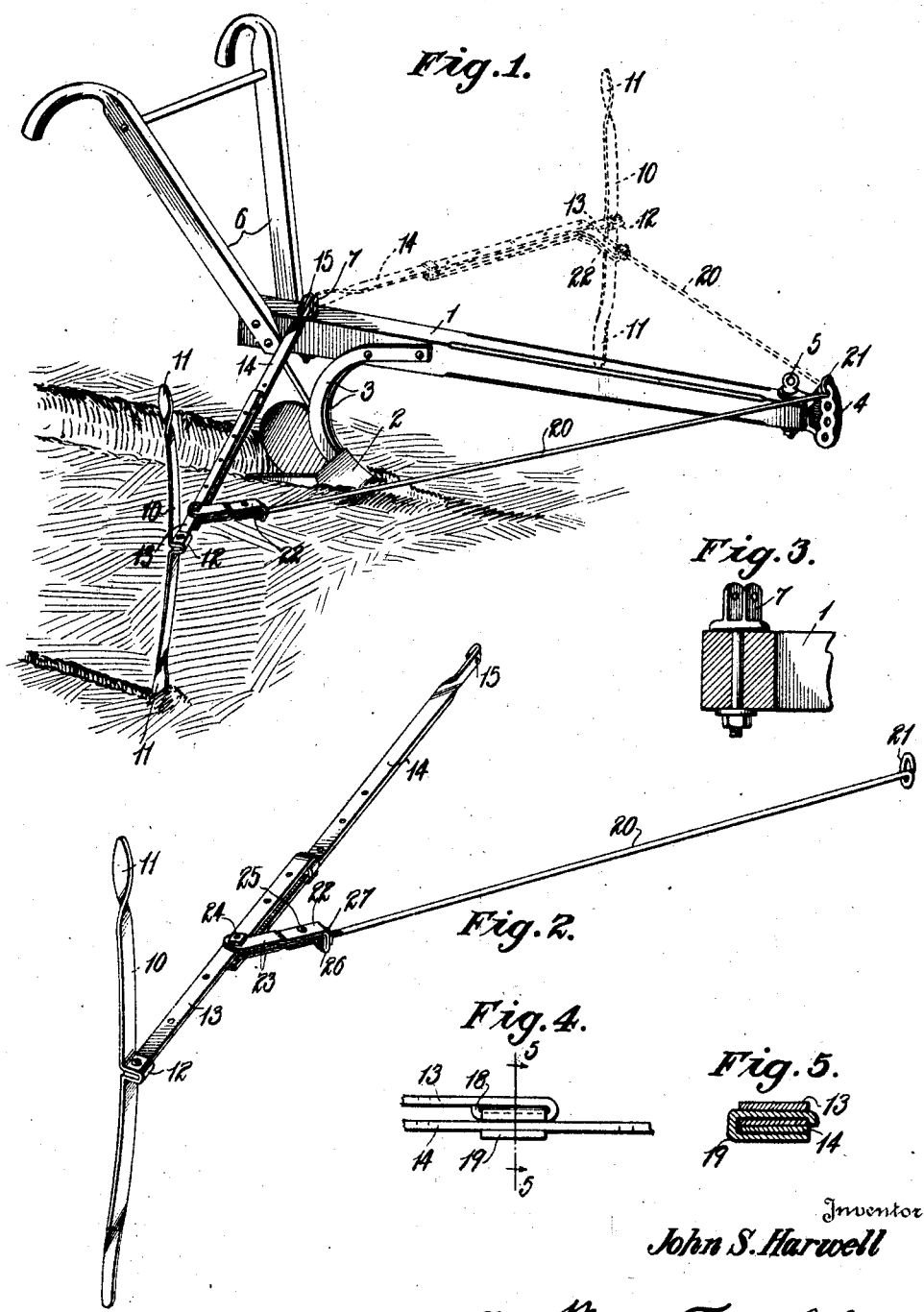

JOHN S. HARWELL, OF MURRYCROSS, ALABAMA.

FURROW-MARKER.

1,378,788. Specification of Letters Patent. Patented May 17, 1921.

Application filed December 13, 1919. Serial No. 344,734.

*To all whom it may concern:*

Be it known that I, JOHN S. HARWELL, a citizen of the United States, residing at Murrycross, in the county of Etowah and State of Alabama, have invented certain new and useful Improvements in Furrow-Markers; and I do hereby declare the following to be a full, clear, and exact description of the invention, such as will enable others skilled in the art to which it appertains to make and use the same.

My invention relates to furrow markers for plows and its objects are to render the marker easily reversible without the use of guy ropes or links leading up to the handles of the plow; to render the adjustment more delicate; to improve the construction of the joints and connection of the marker attachment.

The invention comprises an attachment having a marker-beam which is extensible and carries a curved or bowed earth-marking tool at its end, and a brace-rod, both the marker-beam and the brace-rod being pivoted to the plow beam by universal joints, all as more fully hereinafter described and set forth in the appended claims.

In the accompanying drawings,

Figure 1 is a perspective of a plow with my attachment thereon, showing by full and dotted lines, respectively, the attachment on both sides of the plow.

Fig. 2 is a perspective of the attachment removed from the plow.

Fig. 3 is a section through the plow-beam showing the means whereby the marker-beam is universally hinged to the plow-beam.

Fig. 4 is a detail of the sliding joint between the two bars constituting the marker-beam.

Fig. 5 is a cross section on the line 5—5 of Fig. 4.

Fig. 1 illustrates a plow with my marker in place wherein the beam is indicated by the numeral 1; the plow iron by the numeral 2 and the plow shank by the numeral 3. At the forward end of the beam is the usual clevis 4, held in place by a swiveling clevis pin 5, having an eye at its upper end. The handles of the plow are designated 6. At the rear end of the beam is a swiveled bolt 7, having two ears projecting from its upper end, through which perforations are formed to receive a hinge pin. The swiveled bolt is located as nearly as practicable to the points of connection of the handles 6 to the beam.

The earth-marking tool consists of a bowed member 10, made of metal and may be more or less elastic. The opposite ends of the member 10 are twisted to form opposite marking points 11, respectively adapted to engage and mark the surface of the earth according to which side of the plow the device projects from. The marking tool 10 has mid-way of its end a bent portion 12, adapted to fit over one of the bars of the marking-beam. The marking-beam is composed of two bars which are slidable with respect to each other. These bars are numbered 13 and 14 in the drawings. One end 15 of the bar 14 is pivoted to the swivel-bolt 7; the bar 13 is slidably connected to the bar 14 by means of the joint shown in Figs. 4 and 5. As shown in said figures, one end of the bar 13 is bent to form a flat loop 18, the recurved end of which is adapted to lie flush against the bar 14. A link 19 formed of strap iron is passed through the said flat loop in the bar 13 and embraces the bar 14 as shown in Fig. 5. By means of this construction the bars 13 and 14 are slidable with respect to each other and the marker-beam is adapted to be lengthened or shortened.

A brace rod has an eye 21 on one end; the eye 21 is linked with the clevis 4. The brace rod 20 is connected adjustably to the marker-beam by the connecting member 22 as shown in Fig. 2. The member 22 has at one end two spaced parallel ears 23 having registering perforations through them, and at its other end a down turned lug 26, which is perforated. Between the ends of the member 22 there is another perforation which receives an upturned end of the brace rod 20 after it has passed through the perforations in the lug 26, this end of the rod 20 is screw threaded and a pair of clamp nuts 27 hold it rigidly to the lug 26. The ears 23 are slightly curved laterally as shown so that the arm 20 may fold against the marker-beam parallel therewith when the device is removed from the plow. The member 22 is secured to the marker-beam by placing the lower ear between the two bars 13 and 14 and the upper ear above the bar 13, with the perforations in the ears in registry with two corresponding perforations formed respectively in the bars 13 and 14, and inserting a bolt 24.

It will be apparent that the marker may be adjusted nearer to or farther from the plow by sliding the member 13 with respect to the member 14 and bolting the member 22 thereto at any of the several registering orifices illustrated. By moving the bar 13 outward and securing the member 22 always at the same hole of the member 14 the marker 10 may be adjusted at intervals represented by the distance of the holes apart; intermediate adjustment may be obtained by changing the point of connection between the member 22 and the bar 14 and this is permitted by the series of holes in both bars. The intermediate adjustment referred to, is due to the change of angularity produced by shifting the outer end of rod 20 inward on the bar 14.

By universally swiveling the marker-beam and the brace-rod on the plow-beam, flexibility and delicacy of adjustment is possible.

By hinging the marker-beam at a point close to the handles it is possible for the plowman to reach over and grasp the marker-beam with his hand and throw it over to the other side when it is desirable to change the position of the marker. This relative position of the hinged marker-beam with respect to the plow handles tends toward simplicity of construction as it avoids the use of a guy rope or link reaching from the end of the marker-beam to a position near the hand of the plowman.

The use of the clevis as one hinge and the swivel bolt 7 as another tend toward simplicity and cheapness of construction as well as to flexibility of adjustment.

The earth-marking tool 10 having its convex side in the direction of the travel of the plow prevents the point of the marker from digging into the ground and operating jerkily. The rigid brace-rod 20 acting as a tension member when the marker is working also forms in connection with the marker-beam a three-point frame rigid in all directions in its own plane.

It will be apparent from the foregoing description that my construction is cheap, simple and efficient.

Having thus described my invention and the mode of using it what I claim and desire to secure by Letters Patent is as follows:

1. In an earth marking tool for plows, a marker beam comprising flat bars provided with spaced perforations, the outer of said bars having one end bent upon itself to provide a loop, a link member engaged within said loop and embracing the other bar of said marker beam, a rigid brace rod universally hinged to the front end of the beam and having spaced members provided with alined bolt holes and adapted to be connected to the marker beam with said spaced members embracing the outer bar of said beam, and a bolt adapted to be inserted through the bolt holes to secure the brace rod to the marker beam.

2. The combination with a plow beam of a furrow marker comprising a marker support hinged to the plow beam, an earth marking tool attached to the end of said marker beam, said earth marking tool, comprising a curved elastic bar having a suitable earth marking point, rigidly mounted on the end of the marker support with its convex side toward the direction of movement during the marking operation.

In testimony whereof I affix my signature.

JOHN S. HARWELL.